US010171943B1

(12) United States Patent
Rouphael

(10) Patent No.: US 10,171,943 B1
(45) Date of Patent: Jan. 1, 2019

(54) SYSTEM AND METHOD FOR UTILIZING AN ARRAY OF MOBILE DEVICES FOR IMAGING AND USER EQUIPMENT POSITIONING

(71) Applicant: QUALCOMM Incorporated, San Diego, CA (US)

(72) Inventor: Antoine Jean Rouphael, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/620,449

(22) Filed: Jun. 12, 2017

(51) Int. Cl.

| | |
|---|---|
| ***H04W 4/02*** | (2018.01) |
| ***H04W 4/04*** | (2009.01) |
| ***H04L 29/06*** | (2006.01) |
| ***G01S 5/02*** | (2010.01) |

(52) U.S. Cl.
CPC ............. *H04W 4/023* (2013.01); *G01S 5/021* (2013.01); *G01S 5/0252* (2013.01); *H04L 65/403* (2013.01); *H04L 65/602* (2013.01); *H04W 4/046* (2013.01)

(58) Field of Classification Search
CPC ......... H04W 4/02; H04W 4/04; H04W 4/021; H04W 4/023; H04W 4/025; H04W 4/028; H04W 4/08; H04W 56/0055; H04W 56/006; H04W 72/121; H04W 4/046; H04W 4/029; H04W 48/04; H04W 4/026; H04W 4/027; H04W 4/21; H04W 4/38; H04W 4/40; H04W 4/46; H04W 84/18; H04W 4/44; G06Q 20/30; G06Q 30/02; H04L 29/06; H04L 65/403; H04L 65/602; G01S 5/02; G01S 5/021; G01S 5/00; G01S 5/0009

See application file for complete search history.

(56) References Cited

U.S. PATENT DOCUMENTS

| | | | | |
|---|---|---|---|---|
| 8,054,762 | B2 * | 11/2011 | Potkonjak ............. | G01S 5/0226 370/254 |
| 8,077,091 | B1 | 12/2011 | Guigne et al. | |
| 8,781,496 | B2 * | 7/2014 | Richardson ........... | G01S 5/0236 455/41.2 |
| 8,818,418 | B2 | 8/2014 | Moshfehi | |
| 9,534,917 | B2 * | 1/2017 | Abuelsaad ............. | G01C 21/34 |

(Continued)

OTHER PUBLICATIONS

International Search Report and Written Opinion—PCT/US2018/031034—ISA/EPO—Jul. 25, 2018.

*Primary Examiner* — Meless Zewdu
(74) *Attorney, Agent, or Firm* — Bala Ramasamy

(57) ABSTRACT

Disclosed is a method and apparatus for utilizing an array of one or more mobile devices to perform a task. The method may include accessing a task to be performed using the array of one or more mobile devices. The task may include user equipment positioning, imaging a real world area, or a combination thereof. The method may also include receiving signals collected by the array of one or more mobile devices while the task is being performed, and determining an uncertainty of a result of the task being performed based, at least in part, on one or more characteristics associated with the array of mobile devices and the task being performed. Furthermore, the method may include adjusting the array of mobile devices to reduce the uncertainty of the result of the task being performed.

8 Claims, 8 Drawing Sheets

(56) References Cited

U.S. PATENT DOCUMENTS

| | | | | |
|---|---|---|---|---|
| 2003/0107323 | A1 | 6/2003 | Stam | |
| 2009/0092075 | A1* | 4/2009 | Corson | H04L 5/0035 370/328 |
| 2011/0032146 | A1* | 2/2011 | Halivaara | G01S 19/05 342/357.64 |
| 2012/0310529 | A1* | 12/2012 | Hamilton | G01C 21/206 701/433 |
| 2014/0011518 | A1* | 1/2014 | Valaee | H04W 64/00 455/456.1 |
| 2014/0327770 | A1 | 11/2014 | Wagreich | |
| 2015/0177002 | A1* | 6/2015 | Sourani | G01C 21/26 701/532 |
| 2016/0025837 | A1 | 1/2016 | Hillier | |
| 2016/0033616 | A1 | 2/2016 | Sen et al. | |
| 2016/0170005 | A1 | 6/2016 | Pon et al. | |
| 2016/0174031 | A1 | 6/2016 | Smith et al. | |
| 2017/0078989 | A1* | 3/2017 | Kravets | G01S 5/04 |
| 2017/0086022 | A1* | 3/2017 | Beattie, Jr. | H04W 4/023 |
| 2017/0131717 | A1* | 5/2017 | Kugelmass | G05D 1/0088 |
| 2017/0156123 | A1* | 6/2017 | Smith | H04W 56/0015 |
| 2017/0192083 | A1* | 7/2017 | Avitzour | G01S 5/0273 |

* cited by examiner

SYSTEM AND METHOD FOR UTILIZING AN ARRAY OF MOBILE DEVICES FOR IMAGING AND USER EQUIPMENT POSITIONING

FIELD

The subject matter disclosed herein relates generally to positioning and imaging processes performed by user equipment and a plurality of mobile devices.

BACKGROUND

With the proliferation of user equipment devices, such as cellular telephones, people will often have their user equipment on their person. For example, a person typically carries their smartphone, smartwatch, gaming device, etc. with them throughout their day. Furthermore, the user equipment will also be powered on. As such, regardless of a current usage of the user equipment, the user equipment will still be sending and receiving various communications signals for different wireless communication network(s), such as cellular telephone network signals, wireless computer networks (WLAN, WWAN, peer-to-peer, etc.) signals, etc.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
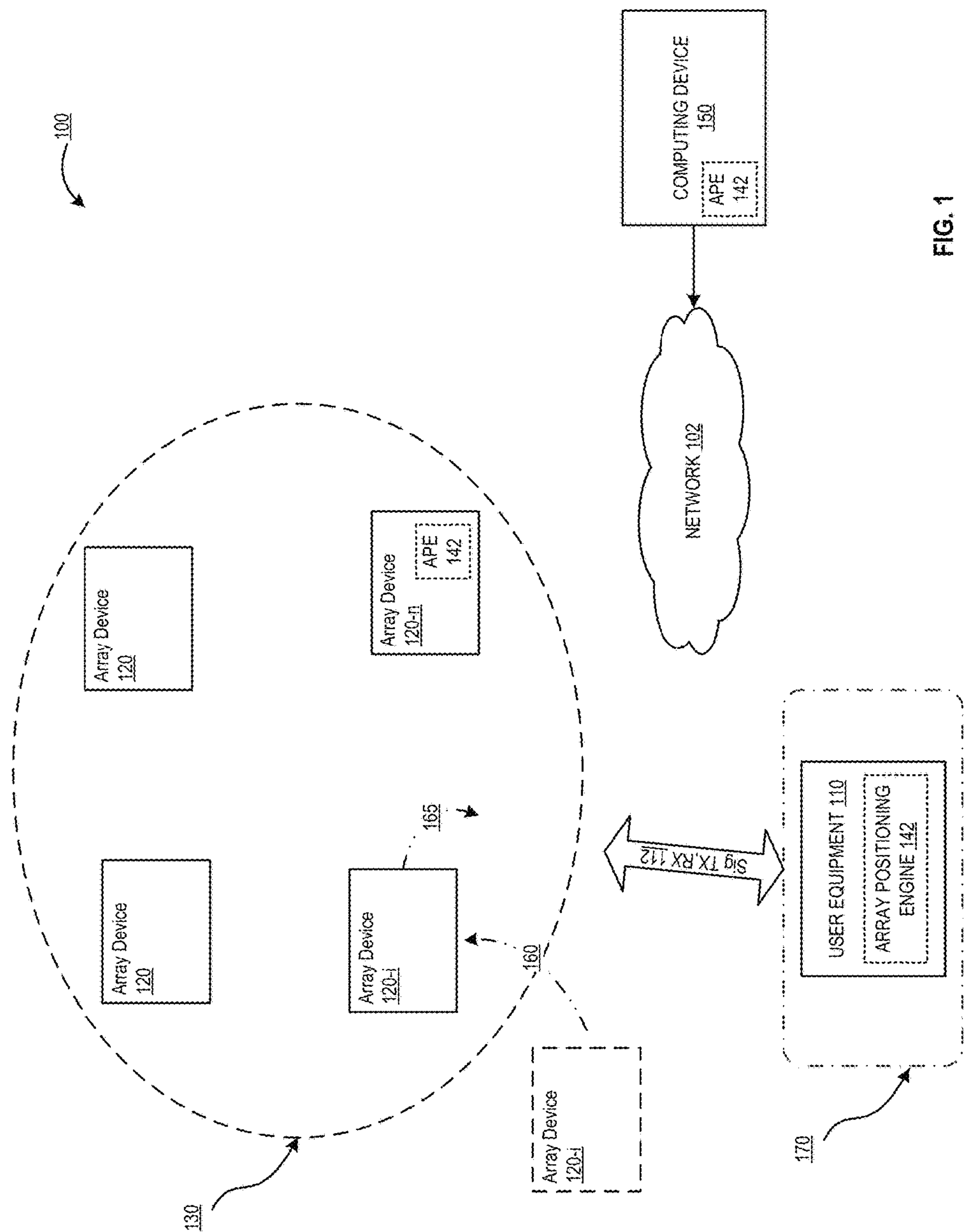
FIG. 1 is a block diagram of an exemplary system architecture for utilizing an array of mobile devices for user equipment positioning and imaging a real world area.

FIG. 1 is a block diagram of an exemplary system architecture 100 for utilizing an array of mobile devices for user equipment positioning and imaging a real world area. In one embodiment, an array 130 for receiving wireless communication network signals 112 generated by user equipment 110 is formed by two or more array devices 120. In one embodiment, the array devices are mobile devices. For example, an array device may be an unmanned vehicle, such as drones capable of autonomous flight, flight remotely controlled by a management entity, flight remotely controlled by one or more human operators, or a combination thereof. As another example, an array device may be a manned vehicle, such as autonomous driving motor vehicle with human occupants. As yet another example, an array device may be a user equipment device. In embodiments discussed herein, a combination of different unmanned, manned, and user equipment devices may form array 130 that acts as an antenna array for transmitting and/or receiving wireless signals as discussed in greater detail herein. In embodiments, the array 130 may be a smart, adaptive antenna, multiple input multiple output (MIMO), or other type of antenna array capable of being spatially or otherwise configurable during signal transmission and/or reception operations, as discussed in greater detail herein.

Each of the array devices 120 includes a signal transmitter and a signal receiver for transmitting and receiving wireless network signals. As will be discussed in greater detail below, the receiver of each array device 120 may be configured to receive wireless networks signals, such as those generated by user equipment 110, when performing positioning for user equipment. Furthermore, the transmitter and receiver of each array device 120 may be configured to transmit wireless network signals and then collect the wireless network signals transmitted by other array devices 120 in order to generate an image of a real world area (e.g., area 170) using radio computed tomography. The transmitter and receiver of each array device may be part of an existing communication system (e.g., a cellular, WLAN, WWAN, peer-to-peer, etc. communication system) of the array device. In another embodiment, however, one or more of the transmitter or receiver may be a special purpose transmitter or receiver that performs signal transmission/reception independent of the other communication systems of the array device.

In one embodiment, an array positioning engine (APE) 142 may establish the array of mobile devices by initiating communication with each array device. The APE 142 may be part of user equipment 142, for which a location is being determined, part of one or more of the devices 120 in array 130 (e.g., such as APE 142 of array device 120-*n*), part of a remote computing device 150, or may be distributed between any combination of devices. The communication with each array device 120 may be established by the APE 142 using one or more communication networks (e.g., network 102), such as cellular, WLAN, WWAN, ad-hoc, etc. networks. However, APE 142 may establish direct communication with each array device, for example, using signals 112. Furthermore, one or more of the array devices, such as array device 120-*n* may be chosen, defined, or otherwise selected as a leader of the array devices. As the leader of the array devices, array device 120-*n* communicates with the APE 142 and relays communications, instructions, data, etc. to/from the APE 142 and the other array devices.

After the array has been established, an APE, such as APE 142 of user equipment 110, APE of computing device 150, APE 142 of array device 120-*n*, or a combination thereof, communicates with array devices 120 and instructs each array device 120 in the array to gather one or more wireless communication network signals for the purpose of performing a positioning process that determines a location of user equipment 110. If a search target (e.g., user equipment 110) is known before a positioning operation is performed, one or more identifiers may be specified by the APE 142 to enable each array device 120 to gather select signals (e.g., those generated by the target), while disregarding other signals (e.g., those generated by, for example, another array device).

In one embodiment, however, each array device can collect and correlate signals from a plurality of different sources. For example, in addition to capturing those signals generated by user equipment 110, each array device 120 may capture signals generated by the other array devices 120. By capturing these signals, APE 142 may establish a current position, direction of movement, speed, orientation, range, etc. of each device performing, and/or capable of performing, positioning. However, one or more array devices 120 may also communicate its position, direction of movement, speed, etc. to APE 142, for example, from a positioning process performed locally at a respective array device.

In embodiments, the wireless communication network signals 112 generated by user equipment 110, and collected by the array devices 120 of the array 130, are those signals generated by user equipment 110 with or without user intervention. For example, the mobile device may automatically generate certain signals for communicating over one or more of a cellular communication network, over a wireless computer network, or over other network, such as LTE (Long Term Evolution), CDMA (code division multiple access), WCDMA (Wide Band CDMA), GSM (Global System for Mobile communications), EDGE (Enhanced Data GSM Environment), 802.11n wireless networking, or other signaling schemes at various frequencies.

The APE 142, in embodiments, collects the signal data 112 received by each of the array devices 120, such as one or more of the LTE, CDMA, WCDMA, GSM, EDGE, 802.11n, etc. signals. Furthermore, specific data elements from the collected signals, such as received signal strength (RSSI) from the automatic gain control (AGC) loop, pilot symbols for coherent detection from the data packet stream, data symbols for blind detection if pilot symbols are not available, antenna gain and directivity, spatial and temporal data collected for MIMO operations, time recovery information, as well as other data elements that can aid in the direction finding process may also be captured by the array devices 120, collected by an APE 120, and associated with their respective signals. In embodiments, each array device 120, or subsets of array devices 120, may receive the same and/or different types of signals and/or different elements of the received signals. In embodiments, signals and/or the data elements of those signals are collected for a threshold amount of time in order to form a minimum amount of data for the signal processing operations discussed below.

In one embodiment, from the collection of signal data and signal data elements, the APE 142 performs one or more signal processing operations. In embodiments, the signal processing operations can include performing one or more of signal detection (e.g., to discern a specific signal source from other signal sources), direction of arrival for a detected signal (e.g., to determine a position where a signal may be emanating), as well as other operations. The signal processing operations, performed by APE 142, enable the APE 142 to detect and pinpoint a position of a source of the signals, such as determining a position of user equipment 110 using the array 130 of devices 120. Thus, the signals automatically generated by the user equipment 110 or other devices 120, collected by the array of devices 120, and analyzed by one of the APEs 142, enable the position of the target device for which signals are being captured, to be determined without any user intervention.

In one embodiment, the determined location of user equipment 110 is associated by the APE 142 with a degree of uncertainty as a result of one or more positioning metrics used in the signal processing operations. The positioning metrics associated with the collection of signals 112 can include, for example, signal strengths for signals received from particular array devices, orientation of particular array devices for receiving signals, signal timing data, relative signal timing associated with those signals received at different array devices, power of received signals at different array devices, location of devices within/outside array, relative locations of devices, as well as other indicators of the precision of captured signal data. Thus, the quality of the location determination can be determined by APE 142, such as determining if the positioning uncertainty exceeds an uncertainty threshold.

In embodiments, one or more of the positioning metrics, however, may be adjusted by APE 142 in order to improve the accuracy and reduce uncertainty of the positioning process performed by APE 142, such as when a positioning determination exceeds an uncertainty threshold. For example, knowledge of a position of the array devices 120 and user equipment 110 enables an APE 142 to modify one or more positioning metrics associated with one or more captured signals 112. For example, APE 142 of user equipment 110 can determine to add array device 120-*i* (which is not part to array 130 at time $t_i$) to array 130 for positioning purposes based on array device's 120-*i* movement (illustrated by arrow 160) (e.g., determined movement into a desirable position at time $t_j$ based on a known speed, direction, etc. of array device 120-*i*). As another example, APE 142-*i* of array device 120-*i* can determine a movement (illustrated by arrow 165) of array device 120-*i* that changes a range, orientation, position, etc. of array device 120-*i* relative to user equipment 110 and/or relative to other array devices 120. In embodiments, determination to add/remove array devices 120 from array 130, determination of new positions to which array devices 120 can be instructed to move within the array 130, determination of what data is collected by one or more array devices 120, as well as other factors, is determined by APE 142 to improve one or more of the positioning metrics used when determining the user equipment's 110 location.

In one embodiment, as discussed above, APE 142 makes one or more adjustments to the positioning metrics to reduce an uncertainty associated with user equipment's 110 positioning determination. This can include the APE 142 selecting a subset of devices that will form array 130 based on current array device locations, future/predicted array and non-array device locations, relative locations of devices within array, movement of devices, etc. In embodiments, these selections are made by APE 142 to improve and/or adjust one or more positioning metrics based on the signal processing operations being performed by APE 142. Furthermore, APE 142 may proactively instruct one or more array devices 142 to change location and/or signal collection parameters in order to improve and/or adjust one or more positioning metrics based on the signal processing operations being performed by APE 142. These adjustments, in embodiments, are continually performed by APE 142 in real time as signals 112 are being collected so that the uncertainty associated with the positioning determination of user equipment 110 is continually refined.

In one embodiment, after the array 130 has been established, an APE, such as APE 142 of computing device 150, APE 142 of user equipment, an APE of one or more array devices 120 (e.g., APE 142 of array device 120-*n*), or a distributed APE, communicates with array devices 120 and instructs each array device 120 to transmit and collect one or more wireless communication network signals for the purpose of generating an image of a real world area, such as area 170. As discussed above, APE 142 may communicate with the array devices through a leader array device, such as a device that relays communications and data to/from the APE 142 and the other array devices.

In embodiments in which area 170 is being imaged, the array 130 at least partially surrounds the area 170 so that the transmission/reception of signals by each array device form a plurality of signal links that pass through area 170. In embodiments, the links enable one or more tomographic imaging operations to be performed to generate an image of area 170 from the transmitted/received wireless network signals.

In one embodiment, the location surrounding area 170 may include the user equipment 110 for which a position has been determined. That is, in addition to determining a location of user equipment 110 using signals 112, APE 142 may additionally image the area surrounding user equipment 110 based on the determined location. However, in other embodiments, area 170 may be imaged by APE 142 regardless of whether user equipment's 110 position is known. For example, where user equipment's 110 position is determined in an emergency situation, real-time imaging of the area 170 surrounding the user equipment's 110 location can be generated to assist emergency services providers (e.g., to provide images of rooms, hallways, geological structures, etc. of the real world area in which user equipment is located). Furthermore, as will be discussed in greater detail below, the images of area 170 can be updated by APE 112 in real time as signals are transmitted/received by array 130 so that the real world area and/or user equipment's 110 movement within the area can be tracked, changing conditions imaged, updated positions determined, etc.

In embodiments in which images of area 170 are to be generated, APE 142 instructs each array device 120 in array 130 to periodically transmit signals having one or more signal transmission characteristics through the area 170 to be imaged. For example, APE 142 can instruct each array device 120 to transmit signals at a specific frequency, time, power, location, direction, etc. through area 170. The signal transmission characteristics may be the same for each array device 120, or may be varied based on the imaging that is to be performed. In embodiments, the signal transmission instructions further include instructions to encode signal transmission characteristics, such any combination of an array device identifier, a location of transmission, etc., into the transmitted signals. In embodiments, specially generated signals need not be generated by each array device 120. Instead signals that are transmitted in the normal course of array device operations, such as signals 112, may serve as the signals transmitted for imaging purposes. However, to support the imaging operations discussed in greater detail herein, the transmitted signals are still encoded with the various signal transmission characteristics (e.g., device ID, transmit location, transmit power, transmit direction, transmit frequency, etc.).

Along with the transmission of signals through area 170, in embodiments, each array device 120 collects one or more of the signals transmitted by one or more other array device(s) 120. In one embodiment, the received signals are measured to determine signal reception characteristics, such as power, frequency, direction of arrival, etc. of the received signals. In embodiments, an array device 120 that receives signals may also decode at least a portion of the received signals to extract one or more the signal transmission characteristics (e.g., an array device identifier). The measurements and any extracted information are then provided to the APE 142 for generating images of area 170 based on the received signal measurements. Additional information, such as a location of array device that received the signals is also provided to APE 142.

In embodiments, APE 142 performs one or more tomographic image processing operations based on differences in the transmitted signal characteristics and the received signal characteristics. That is, when the signals are transmitted through area 170 by each of the array devices 120, the user equipment 110 and features within area 170 (e.g., structures, people, natural objects, etc. within area 170) will absorb, reflect, and/or deflect the transmitted signals to some degree. APE 142 utilizes the signal transmission and reception identifiers to associate signal source and signal transmission characteristics (e.g., transmission location, transmit power, transmit frequency, transmit direction, etc.) with the corresponding measured signal reception characteristics (e.g., reception location, reception power, reception frequency, reception direction, etc.). The difference in the characteristics for the transmitted signal and associated received signal(s) are indicative of signal absorption, reflection, deflection, etc. caused by the features of area 170 as the signals pass through area 170.

In one embodiment, an APE 142 collects the received signal measurements and any information extracted from the received signals. In embodiments, APE 142 may perform further signal measurement decoding, for example when received signals are provided to APE 142. In one embodiment, APE 142 utilizes the collected signal transmission characteristics information and associated measured signal reception characteristics information and performs one or more tomographic processing operations, such as an iterative or recursive tomographic reconstruction process, on the signal characteristics to generate an image of area 170. In embodiments, the image is generated in real time, or near real time, and represents a three-dimensional model of area 170. For example, the image generated by APE 142 can image rooms, walls, floors, etc. of a structure such as a building. As another example, the image generated by APE 142 can image an outdoor environment, including trees, rocks, terrain, etc. within an imaged area. As yet another example, a target object, such as user equipment 110 for which a position has been determined, can serve as an object of interest, and natural and/or man-made features surrounding the target object within area 170 can be imaged along with the user equipment 110 within area 170.

In any of these embodiments, the signal transmission and reception instructions discussed above can include transmitting signals at a periodic interval, such as every $1/10^{th}$ of a second, every second, every minute, etc. In embodiments, the images generated by the tomographic processing operations can be updated by APE 142 in real time to reflect changes in the area (e.g., area 170) being imaged. The changes can include any of movement of a target object (e.g., so that the target object can be tracked within the images in real time), updates in the features of the real world area (e.g., so that changes can be taken into account by an entity using the images, for example, an emergency responder), or a combination of object tracking and feature updating.

In one embodiment, the image(s) generated by the tomographic processing operations are associated by the APE 142 with a degree of imaging quality as a result of the one or more signal transmission and signal receiption characteristics (e.g., signal transmission strength, number of signal transmitters, signal transmit locations of array devices, relative signal transmit locations, pattern of signal transmit locations, reception locations of array devices, relative reception locations, pattern of signal reception locations, number of devices performing signal reception, area being imaged relative to a target of interest, resolution of an image, etc.). Thus, similar to the analysis of a location determination quality based on one or more positioning metrics, APE 142 may also determine whether imaging quality of generated images exceeds a quality threshold.

In embodiments, APE 142 may update one or more of the signal transmission and signal reception instructions to refine images generated by the tomographic processing operations in order to improve one or more imaging quality factors, such as resolution, refresh rate, location of an object of interest relative to an area covered by a generated image, expansion of an image of a real world area, shifting an area being imaged in real time based on movement of a target object being tracked, etc. In embodiments, APE 142 may alter signal transmission and/or reception characteristics of one or more array devices 120 in order to improve imaging quality so that imaging quality exceeds the quality threshold. For example, APE 142 may alter a transmit location of one or more array devices 120 to alter their relative locations, collective geometric orientation, density with respect to an area being imaged, distance from an area being imaged, etc. As another example, devices may be added or removed from the array 130 based on their movements and expected trajectories. In this scenario, transient devices that are not specifically deployed as part of array 130 can be utilized when their position corresponds with array 130, such as predicted movement 160 of array device 120-I into array 130. As yet another example, for periodic image updates (e.g., for images updated every minute), one or more array devices can be instructed to transmit and receive signals at sub-intervals using a pattern of movement so that each transmission/reception occurs at different locations. For example, each array device may be instructed to transmit at 4 subintervals in a zig-zag, square, linear, etc. pattern so that signal number of transmissions/receptions for the period of time for which an image is generated can be increased relative to the number of subintervals (e.g., increasing total signal measurements from which an image is generated without increasing the number of array devices). Beneficially, the same number of array devices can transmit more signals and perform more measurements during a period of time in which a tomographic image is generated. The selection of a subinterval and/or pattern of movement enable APE 142 to improve one or more of image resolution, imaged area expansion, density of signal sources, etc. without requiring the addition of new array devices 120.

Figure 2:
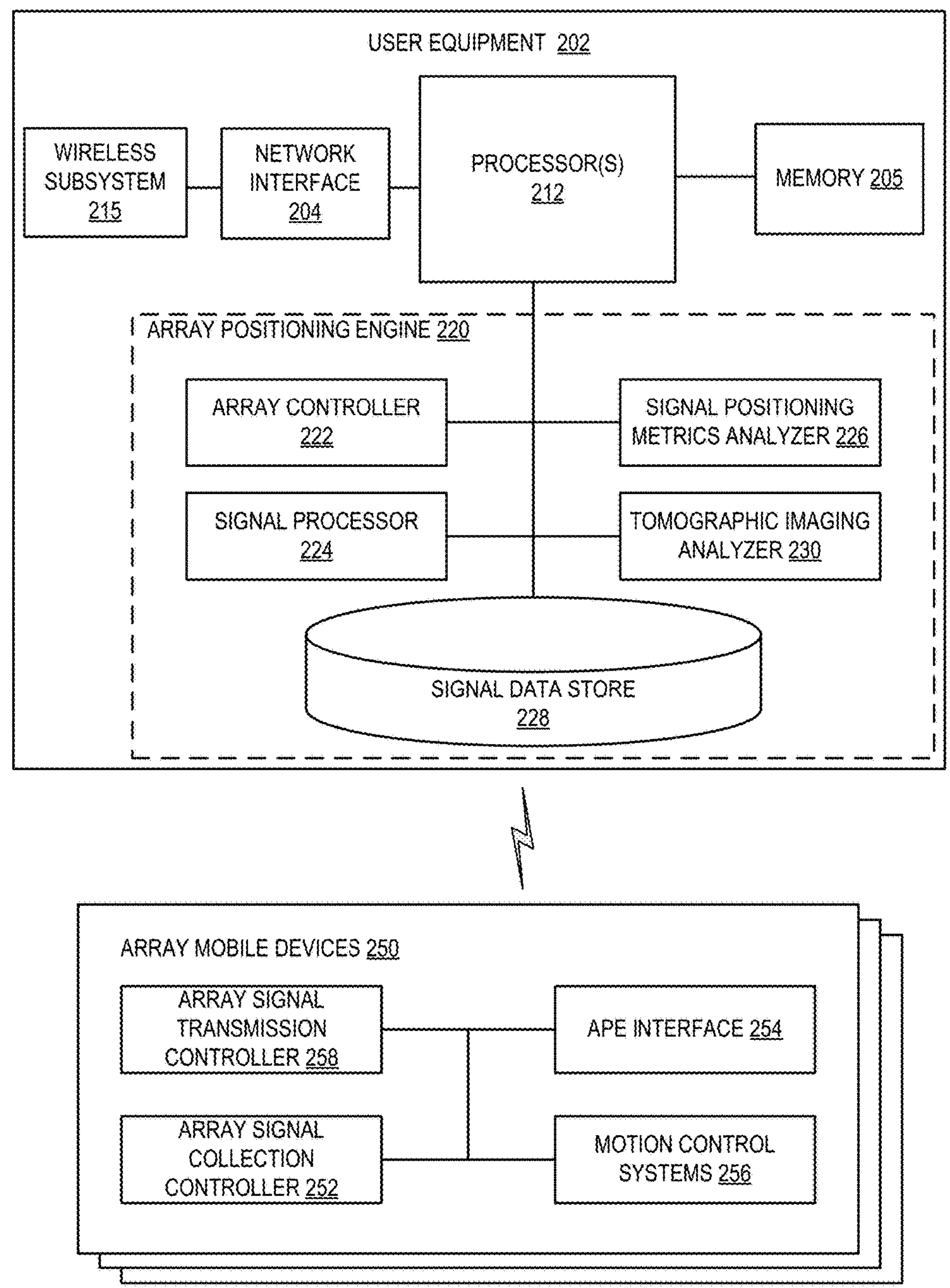
FIG. 2 is block diagram of one embodiment of user equipment and one or more array mobile devices.

FIG. 2 is block diagram of one embodiment of user equipment and one or more array mobile devices. User equipment 202 and array mobile device(s) 250 provide additional details for user equipment 110 and array devices 120 discussed above in FIG. 1.

In one embodiment, user equipment 202 is a system, such as a mobile telephone, smartphone, wearable device, portable gaming system, purpose built device, or other mobile device, which may include one or more processors 212, a memory 205, a network interface 204, and a wireless subsystem 215. It should be appreciated that user equipment 202 may also include, although not illustrated, a user and/or hardware interface, one or more sensors (e.g., accelerometers, gyroscopes, etc.), a power device (e.g., a battery), as well as other components typically associated with user equipment. Although only a single wireless subsystem 215 is illustrated, it is understood that network interface 204 may also be capable of communicatively coupling user equipment 202 to a number of wireless subsystems 215 (e.g., Bluetooth, WiFi, Cellular, or other networks) to transmit and receive data streams through a wireless link to/from a network (e.g., network 102). In one embodiment, wireless subsystem 215 may also be used by user equipment 202 to transmit signals, LAN, WAN, personal area network, etc. signals without user intervention, which are received by array device(s) 250 as discussed in greater detail herein.

Memory 205 may be coupled to processor(s) 212 to store instructions for execution by processor(s) 212. In some embodiments, memory 205 is non-transitory. Memory 205 may also store one or more processing modules of array positioning engine 220, such as array controller 222, signal processor 224, signal positioning metrics analyzer 226, tomographic imaging analyzer 230, and signal data store 228, to implement embodiments described herein. It should be appreciated that embodiments of the invention as will be hereinafter described may be implemented through the execution of instructions, for example as stored in the memory 205 or other element, by processor(s) 212 of user equipment 202 and/or other circuitry of user equipment 202 and/or other devices. Particularly, circuitry of user equipment 202, including but not limited to processor(s) 212, may operate under the control of a program, routine, or the execution of instructions to execute methods or processes in accordance with embodiments of the invention. For example, such a program may be implemented in firmware or software (e.g. stored in memory 205 and/or other locations) and may be implemented by processors, such as processor(s) 212, and/or other circuitry of user equipment 202. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by user equipment 202 itself and/or some or all of the functions, engines or modules described herein may be performed by another system connected through network interface 204 to user equipment 202. For example, one or more functions, engines, or modules of APE 220, as well as the APE itself as discussed above, may be implemented remotely at a server computer system (e.g., computing device 150), an array device (e.g., one of array devices 120 or 250), distributed between different devices, etc. Thus, some and/or all of the functions may be performed by another system and the results or intermediate calculations may be transferred back to user equipment 202. However, to avoid obscuring the present invention, the below discussion will describe the APE 220 operating within user equipment 202. Furthermore, the results of, for example user equipment positioning, real world imaging, or a combination thereof, may be transferred to other devices (not shown), such as a remote server computer system (e.g., an assistance data server), an emergency services systems (e.g., an system utilizing user equipment 202 positioning data and/or imaging in an emergency scenario), or other system.

In embodiments, each array mobile device 250 is also a system, and includes an array signal collection controller 252, an array signal transmission controller 258, an APE interface 254, and motion control systems 256. Although not shown, the array mobile devices also have system components, such as processors, communication systems, memories, etc. for executing the functions, engines, and modules described in greater detail herein.

Array positioning engine 220 of user equipment 202 is responsible for performing one or more positioning operations based on signals collected by array mobile devices 250. The signals collected by array mobile devices 250 for determining user equipment 202 location are those signals typically generated by user equipment 202 without user intervention, instruction, or request, such as those signals automatically generated for communicating over one or more communication networks. However, other signals, such as emergency beacons, specially generated, signals, etc. could be used consistent with the discussion herein. Array positioning engine 220 is also responsible for performing one or more tomographic imaging operations based on a collection of signal transmission characteristics and associated measured signal reception characteristics collected by array mobile devices 250.

In one embodiment, array controller 222 establishes communication with the APE interface 254 of array devices 250. The communication may be established over a communications network, such as a WAN, LAN, etc., or established directly with one or more array devices. By establishing communication with one or more mobile devices, array controller 222 establishes the array of mobile devices, which acts as an antenna array, smart antenna array, adaptive antenna array, multi-user MIMO array, or other form of antenna array for transmitting and/or receiving wireless signals, as discussed herein.

In one embodiment, array controller 222 requests that one or more array mobile devices 250 perform signal collection for one or more of the signals generated by user equipment 202. The request can include signal collection parameters, such as user equipment identifier(s), signal type(s), frequency of signal collection, signal parameters to be collected, operations to be performed on the signals etc. Furthermore, array controller 222 can request that different array mobile devices 250 collect different subsets of signals (e.g., different signal types, signals from different/multiple sources, different signal parameters, etc.).

Array signal collection controllers 252 of the array mobile devices 250 then perform signal collection based on the instructions received from APE 220. Furthermore, the signals may be collected by the array mobile devices 250 using one or more existing communication system receivers of the array mobile devices 250, although special purpose receivers may also be used. The signals may also be processed to determine, and/or associated with, positioning metrics by the array signal collection controller 252. The positioning metrics are factors indicating the precision of collected signals for positioning determinations, such as signal strength, orientation of an array device the received a signal, interference indicators that may impact the received signal, signal quality, as well as other positioning metrics. In one embodiment, the positioning metrics can also include one or more metrics describing the array mobile device 250 performing the signal collection, such as device location, direction of movement, speed of movement, type of receiver performing signal collection, orientation of the device, etc.

The signals and associated positioning metrics are then transferred by APE interfaces 254 of the array mobile devices 250 to APE 220. The signals are stored in signal data store 228, and accessed by signal processor 224 for performing one or more signal processing processes based on the collected signals. The signal processing operations performed by signal processor 224 can include performing one or more of signal detection (e.g., to discern a specific signal source from other signal sources when positioning is being performed for multiple devices), direction of arrival for a detected signal (e.g., to determine a position where a signal may be emanating from a specific source), as well as other operations that assist in determining the position of user equipment 202.

Along with signal processor 224 of APE 220 performing the signal processing operations to determine, for example, a position of user equipment 202, signal positioning metrics analyzer 226 additionally determines a quality of the results of the signal processing operations. That is, for example, when the signal processor 224 determines a position of the mobile device from the signals collected by array mobile devices 250, signal positioning metrics analyzer 226 determines a quality of the associated position. In one embodiment, signal positioning metrics analyzer 226 analyzes the positioning metrics (e.g., signal strength, collector orientation, interference, etc.) associated with the signals utilized by signal processor 224 to determine a positioning uncertainty associated with a user equipment positioning determination. That is, the signal positioning metrics analyzer 226 determines an uncertainty of the determined position of the user equipment based on the one or more positioning metrics associated with the received signals. For example, a position estimate based on weak signals that may be subject to interference would likely be associated with a positioning uncertainty that is higher than a position estimate based on strong signals with minimal interference. Signal positioning metrics analyzer 226 then provides one or more positioning uncertainty determinations, including the factors contributing to the positioning uncertainty to array controller 222.

In one embodiment, array controller 22 utilizes the factors contributing to the positioning uncertainty, as well as other positioning metrics to make one or more adjustments to the array of array mobile devices 250 and/or how the signal gathering is performed by the devices within the array. In one embodiment, array controller 222 determines one or more adjustments to reduce the positioning uncertainty. In one embodiment, the determined adjustments can impact how individual array mobile devices perform signal collection (e.g., adjustments to collection frequency, adjustments to the type of signal being collected, adjustments to the timing of when signals are collected, etc.).

In one embodiment, the determined adjustments can further impact which mobile devices are to be part of the array of mobile devices 250. For example, mobile devices may be added to the signal collection array, or removed from the signal collection array, based on their position, current movement, current orientation, predicted future position, etc. That is, array controller 222 utilizes the positioning metrics describing the position and motion of the mobile devices to determine, based on device location, device movement, future predicted positions, etc., which devices should be included in the array or removed from the array.

In one embodiment, the adjustments can also impact motion of mobile devices within the array mobile devices 250. In some embodiments, array mobile devices 250 may include one or more unmanned vehicles (e.g., drone aircrafts, autonomous motor vehicles, etc.) that may be repositioned by APE 220. The adjustments determined by array controller 222 may therefore include, for these types of mobile device, instructions to the motion control systems 256 of such mobile devices to change a physical location of the array device, alter a physical orientation of the array device, coordinate the change of positions and/or orientations of a set of array mobile devices, etc. in order to improve the positioning determination of the user equipment 202.

Array controller 222 then sends the adjustments to the associated array mobile devices 250 to alter how those array devices perform signal collection, reporting, processing, etc., and in some embodiments, to alter the physical movement of mobile devices within an array performing signal collection. Thus, a feedback and control loop is formed that enables APE 220 to tune the signal processing operations and resulting positioning determination in real time based on the real world conditions experienced by the array mobile devices. Furthermore, the tuning enables the APE 220 to reduce positioning uncertainty to ensure an accurate an high quality position is being determined from the signals collected by the array mobile devices 250.

In one embodiment, array controller 222 requests that one or more array mobile devices 250 perform signal transmission using specified signal transmission characteristics, and perform measurements of those transmitted signals. The signal transmission characteristics can include a periodicity in which signals are to be transmitted, transmission location, signal power, signal direction, signal frequency, etc. In embodiments, the requested measurements correspond with the specified signal transmission characteristics, such as a request to measure, at the specified period, where signals are received, received signal power, received signal direction, received signal frequency, etc.

Array signal transmission controllers 258 of each array mobile device 250 receive the requests and transmit one or more signals having the specified signal transmission characteristics. Furthermore, the array signal transmission controller may encode data identifying one or more of the signal transmission characteristics within the signals when transmitted by array mobile devices.

Array signal collection controllers 252 of each array mobile device 250 perform corresponding signal reception operations to receive one or more signals transmitted by other array devices 250. For the received signals, array signal collection controller 252 measures the one or more signal transmission characteristics and optionally at least partially decodes the received signals to, for example, determine an identity of the array device that transmitted a received signal. As discussed herein, the measurements enable signal absorption, reflection, deflection, etc. to be determined for signals that travel through a real world area being imaged (e.g., a real world area where user equipment 210 is located). Array signal collection controller 252 then provides the signal measurements and any extracted information to APE 220 via APE interface 254.

APE 220 collects the signal measurements and associated extracted information from a plurality of array mobile devices 250, and stores the signal measurements in signal data store 228. Furthermore, extracted information, such as an array mobile device ID associated with signal measurements, enable APE 220 to associate the signal transmission characteristics with the signal measurements corresponding to a specific identified array device.

In one embodiment, signal processor 224 periodically accesses signal data store 228 to perform one or more tomographic signal processing operations on the collected signal measurements and corresponding signal transmission characteristics. The one or more tomographic signal processing operations can include iterative image reconstruction, recursive image reconstruction, or other computed tomographic image processing techniques that generate an image of a real world area. In one embodiment, the computed images, which may be updated in real time as discussed herein, are provided to one or more systems, such as user equipment 202, an array device 250, a remote system (e.g., computing device 150), an emergency services provider (not shown), etc. Furthermore, for images updated in real time, the updated images can be used by APE 220 or other systems to track movement of a target object (e.g., user equipment 202 or another device) in real time as the target object moves within a real world area.

In one embodiment, tomographic imaging analyzer 230 performs an analysis of one or more factors associated with one or more generated images of the real world area. In embodiments, the one or more factors can include a resolution of an image based on a number or array mobile device used to transmit/receive signal data, a geometric or relative orientation of the array mobile devices when transmitting/receiving signal data, a distance of one or more devices from a real world area being imaged, a density of array mobile devices relative to a real world area being imaged, as well as other factors relevant to a resolution of a topographically generated image. In another embodiment, an image of a real world area relative to a target object may be evaluated to determine if a position of one or more array mobile device 250 accurately capture the surrounding area (e.g., determine if target object is at an edge of the imaged real world area). In another embodiment, movement of a target object relative to a real world area being imaged is analyzed to determine whether and how to shift the real world area to continue to capture the target object. Other analysis factors can be considered by tomographic imaging analyzer 230 consistent with the discussion herein. In one embodiment, the analysis results are compared against one or more thresholds, such as resolution minimum thresholds, relative distance of target object to edges of area being imaged, projected movement of target object, etc. to determine whether the array mobile devices' 250 signal transmission characteristics should be updated.

In one embodiment, when tomographic imaging analyzer 230 determines that signal transmission characteristics should be updated, tomographic imaging analyzer 230 determines which factors are to be adjusted, and instructs array controller 222 to select an update for one or more of the array mobile device 250. For example, to improve imaging resolution, array controller 222 could decide to change positions of array mobile devices relative to one another, alter a geometric configuration of an array of mobile devices, increase density of array mobile devices around the area being imaged, adding or removing mobile devices from an array, subdividing a collection period and having devices transmit/receive at multiple locations within the collection period, etc. As another example, to change an area being imaged (e.g., due to movement of a target object), array controller 222 could decide to shift positions of all array mobile devices, move a subset of array mobile devices based on the detected target object movement, etc. Other changes to the array may be made consistent with the discussion herein.

In embodiments, APE 220 continues to send signal transmission characteristics instructions to the array mobile devices, and continues to receive signal reception characteristics, on a periodic basis. As discussed herein, the periodic nature of the signal transmission/reception enables APE 220 to generate real-time and three dimensional images of an area. The real-time imaging is useful for tracking movement of a target object in real time (e.g., in an emergency scenario) and for providing a context associated with the real world area being imaged (e.g., illustrating walls, floorplans, geological features, etc.). Furthermore, the real-time imaging enables APE 220 to account for any updates to tracked object movements or feature updates with a real world area during imaging.

Figure 3:
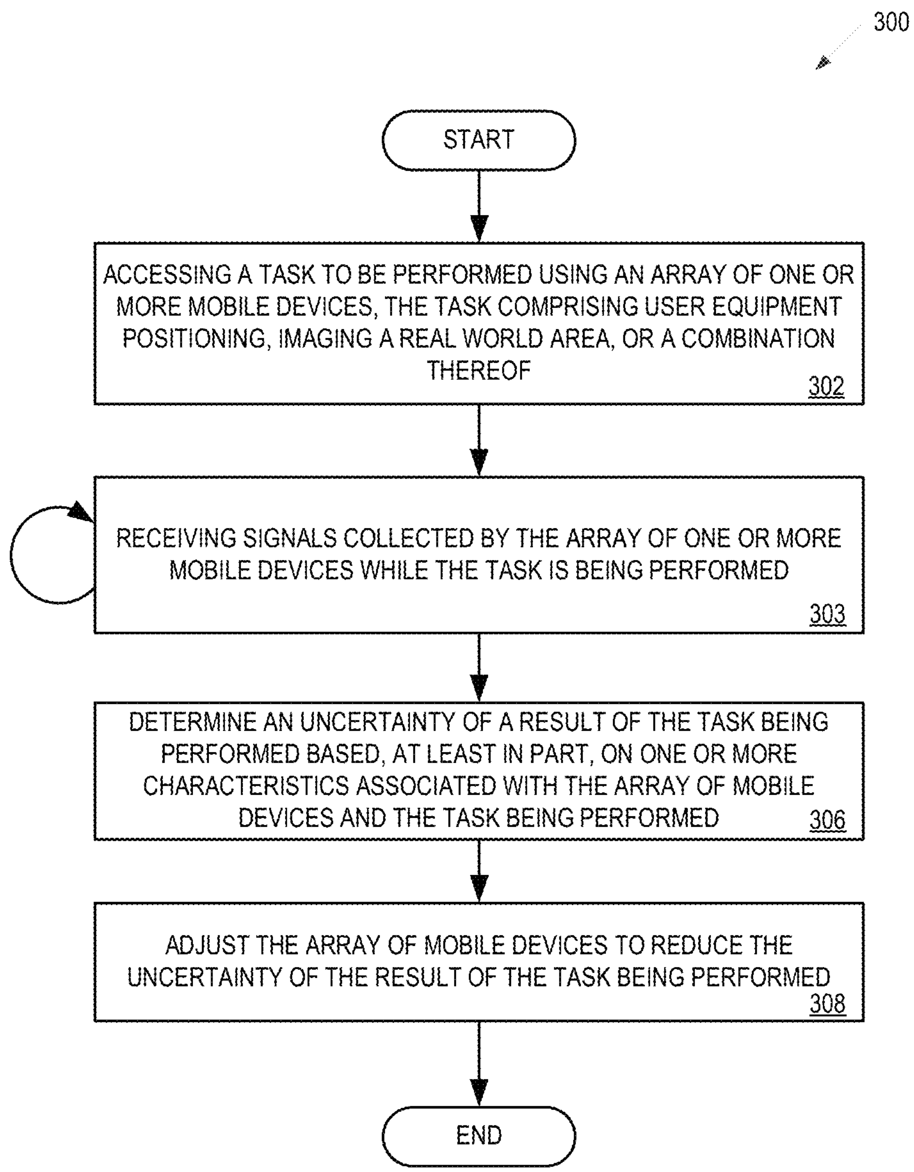
FIG. 3 is a flow diagram of one embodiment of a method for utilizing an array of mobile devices for performing a task.

FIG. 3 is a flow diagram of one embodiment of a method 300 for utilizing an array of mobile devices for performing a task. The method 300 is performed by processing logic that may comprise hardware (circuitry, dedicated logic, etc.), software (such as is run on a general purpose computer system or a dedicated machine), firmware, or a combination. In one embodiment, the method 300 is performed by an array positioning engine (e.g., array positioning engine of user equipment 110 or 202, array positioning engine of computing device 150, an array positioning engine of an array device 120 or 250, or an array positioning engine distributed between two or more devices).

Referring to FIG. 3, processing logic begins by accessing a task to be performed using an array of one or more mobile devices, where the task comprises user equipment positioning, imaging a real world area, or a combination thereof (processing block 302). Processing logic then receives signals collected by the array of one or more mobile devices while the task is being performed (processing block 304). In embodiments, processing logic may perform one or more tasks. For example, processing logic may perform a positioning process to determine a position (e.g., geolocation, relative location, etc.) of user equipment from the signals generated by user equipment and received by the array of mobile devices. As another example, processing logic may perform a tomographic imaging process to generate one or more images of a real world area based on signals transmitted and received by the array of mobile devices. As yet another example, multiple tasks can be performed by processing logic, including determining a position of user equipment (e.g., a geolocation, a relative location, etc.), and then generating an image of an area surrounding the determined position utilizing that determined location. Furthermore, the task may be repeated to, for example, update and track movement of the user equipment in real time, generate updated images in real time, generate images updated in real time based on the tracked movement of the user equipment, etc.

Processing logic determines an uncertainty of a result of the task being performed based, at least in part, on one or more characteristics associated with the array of mobile devices and the task being performed (processing block 306). As discussed herein, the uncertainty of the result can include a positioning uncertainty that is based on one or more positioning metrics, imaging uncertainty that is based on a quality of a generated image determined from signal transmission/reception characteristics, image resolution, image refresh rate, as well as other factors, or a combination of result uncertainties when processing logic is performing positioning and imaging together.

Processing logic then adjusts the array of mobile devices to reduce the uncertainty of the result of the task being performed (processing block 308). In embodiments, the adjustment of the array can include one or more of altering one or more signal transmission characteristics of one or more array devices (e.g., transmit direction, transmit strength, transmit timing, signal type being transmitted, etc.), and/or altering one or more signal reception characteristics of one or more array devices (e.g., reception timing, signal type to be received and decoded, etc.). In embodiments, the adjustment of the array can also include altering one or more physical properties of the array, such as altering one or more of signal transmit/reception location of array device(s), altering locations of array devices relative to one another, adding/removing a mobile device to an array based on determined/projected movement of the mobile device, adjusting a location of the array relative to a target and/or responsive to tracked movement of a target, etc. The adjustments to the array are discussed in greater detail herein.

Figure 4:
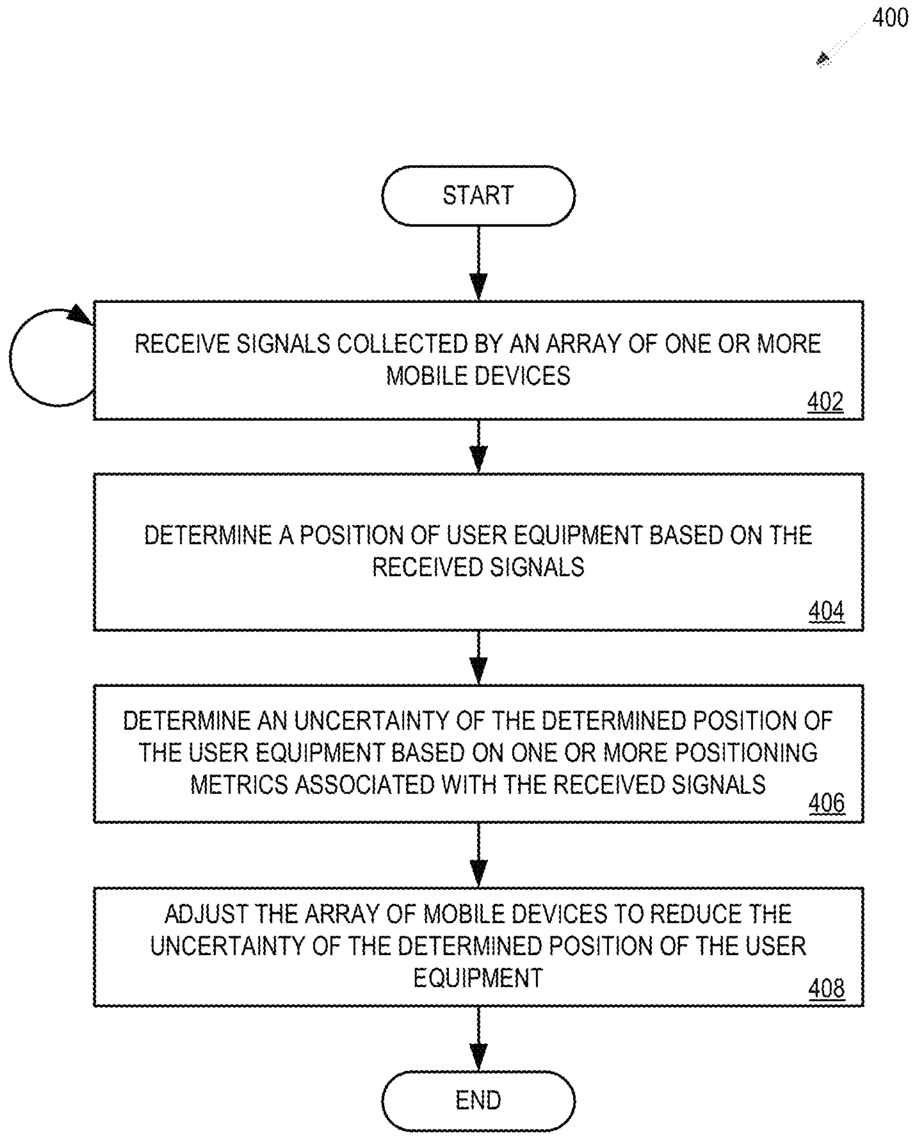
FIG. 4 is a flow diagram of one embodiment of a method for utilizing an array of mobile devices for user equipment positioning.

FIG. 4 is a flow diagram of one embodiment of a method 400 for utilizing an array of mobile devices for user equipment positioning. The method 400 is performed by processing logic that may comprise hardware (circuitry, dedicated logic, etc.), software (such as is run on a general purpose computer system or a dedicated machine), firmware, or a combination. In one embodiment, the method 400 is performed by an array positioning engine (e.g., array positioning engine of user equipment 110 or 202, array positioning engine of computing device 150, an array positioning engine of an array device 120 or 250, or an array positioning engine distributed between two or more devices).

Referring to FIG. 4, processing logic begins by receiving signals collected by an array of one or more mobile devices (processing block 402). As discussed herein, the array of mobile devices can include one or more mobile devices, such as unmanned vehicles, manned and autonomous vehicles, manned vehicles, user equipment devices, etc. Furthermore, the received signals are those typically generated by user equipment when trying to establish, maintain, or otherwise interact with a communications network.

Processing logic then determines a position of the user equipment based on the received signals (processing block 404). In one embodiment, processing logic performs one or more signal processing operations to determine one or more of a signal source, a location of the signal's source, a movement of the signals source, etc. Furthermore, since the received signals and signal processing operations are performed on signals automatically generated by the user equipment, the user equipment's location can be ascertained by processing logic without intervention by a user. This is useful, for example, when a user may be incapacitated (e.g., in an emergency scenario). This is also useful when performing positioning for user equipment without the user equipment using energy consumption heavy sensors (e.g., GPS sensors).

Processing logic then determines an uncertainty of the determined position of the user equipment based on one or more positioning metrics associated with the received signals (processing block 406). As discussed herein, the signals received by processing logic may also include associated positioning metrics that describe the signal, the array device that collected the signal, etc. For example, a signal may be associated with positioning metrics such as interference experienced when a signal was collected, a physical orientation of the array device performing signal collection, the array device's location when the signal was collected, a movement of the array device, etc. Processing logic uses these positioning metrics to determine an uncertainty of the position determined at processing block 404.

Processing logic then adjusts the array of mobile devices to reduce the uncertainty of the determined position of the user equipment (processing block 408). As discussed herein, the adjustment to the array can include determining to adjust which signals are collected by which array devices, what frequency the signal should be collected at, the timing associated with signal collection, etc. Furthermore, physical adjustment can be made to mobile devices within and outside of the array, such as instructing an array mobile device to move positions within the array, instructing an array mobile device to alter its orientation, determining to add mobile device to the array or remove the mobile device from the array at a specific time based on movement and an associated predicted position of that mobile device, etc.

Figure 5:
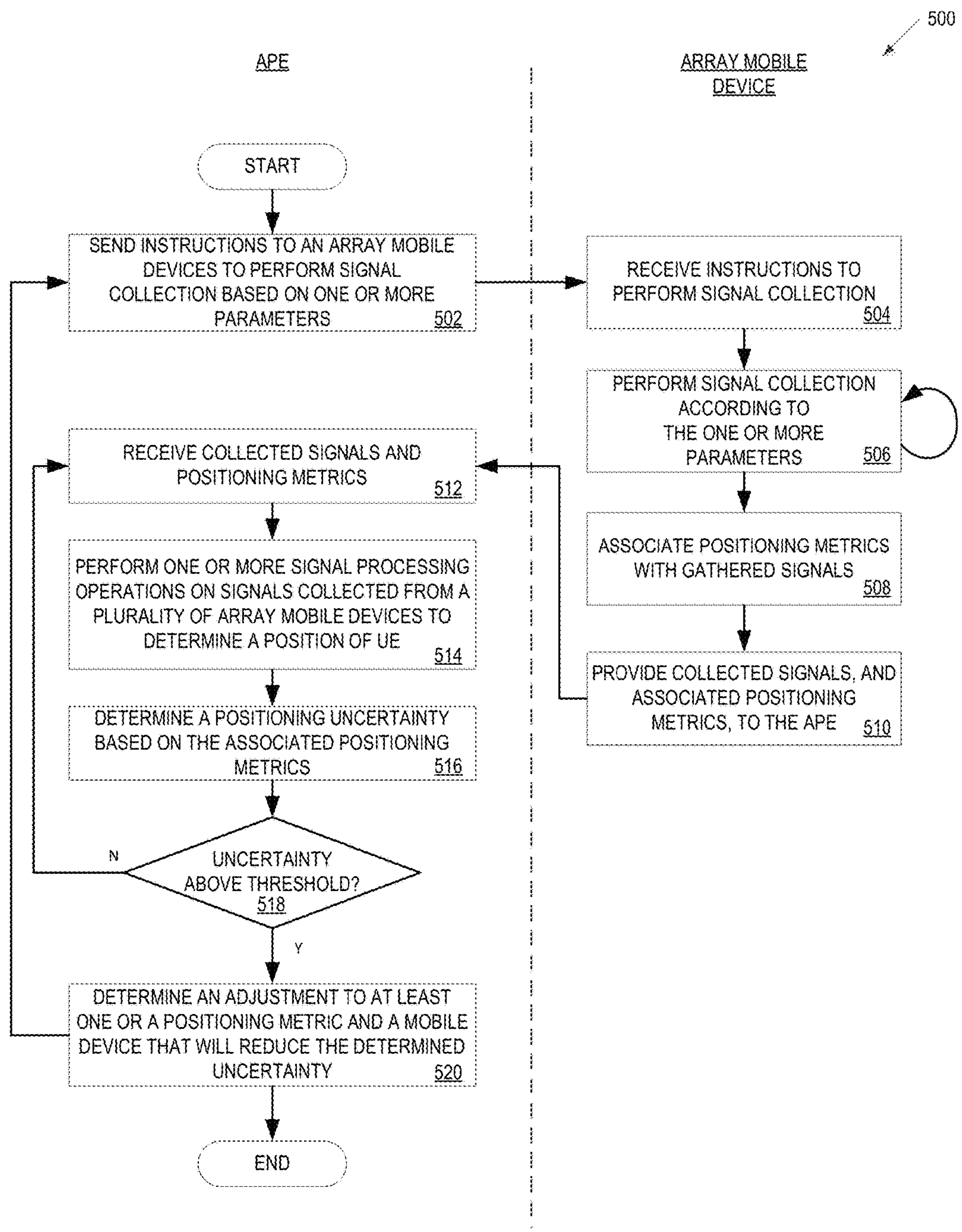
FIG. 5 is a flow diagram of one embodiment of a method for managing an array of mobile devices during positioning performed for user equipment.

FIG. 5 is a flow diagram of one embodiment of a method 500 for an APE and an array device interacting to perform positioning for user equipment. The method 500 is performed by processing logic that may comprise hardware (circuitry, dedicated logic, etc.), software (such as is run on a general purpose computer system or a dedicated machine), firmware, or a combination. In one embodiment, the method 500 is performed by processing logic for an array positioning engine (e.g., APE 142 or 220) and processing logic for an array mobile device (e.g., array mobile device 120 or 250).

Referring to FIG. 5, processing logic of the APE begins by sending instructions to the array mobile device to perform signal collection based on one or more parameters (processing block 502). In embodiments, the parameters can include data regarding the source of the signal (e.g., identifiers for the user equipment for which positioning is being performed), data regarding how signals are to be collected (e.g., frequency, timing, type, etc.), data regarding physical properties of the array device during signal collection (e.g., a requested position, orientation, movement, etc.), as well as other parameters relevant to signal collection.

Processing logic of the array mobile device receives the instructions to perform signal collection (processing block 504), and performs the signal collection according to the one or more parameters (processing block 506). The parameters, as discussed herein, can include instructions as to what signals are to be collected, when the signals are to be collected, the array mobile devices physical properties during signal collection, etc. Processing logic then associates positioning metrics with the gathered signals (processing block 508). The positioning metrics are indicators of the quality specific signals collected by array mobile device. For example, the positioning metrics associated with a collected signal can indicate signal strength, interference, direction, signal type, etc. Processing logic of the array mobile device then provides the collected signals, and their associated positioning metrics, to the APE (processing block 510).

Processing logic of the APE receives the collected signals and positioning metrics (processing block 512). As discussed above, processing logic may also receive signals collected by other array mobile devices (not shown). Processing logic of the APE uses the collected signals from the plurality of array mobile devices when performing one or more signal processing operations to determine a location a position of the user equipment that generated the collected signals (processing block 514). The one or more signal processing operations can include, for example, signal detection, determining signal direction, determining UE position, etc.

Processing logic then determines a positioning uncertainty based on the associated positioning metrics (processing block 516). The positioning metrics for each collected signal and/or each array mobile device can contribute to the positioning uncertainty. Thus, in embodiments, processing logic determines a total uncertainty based on the constituent uncertainties, such as a sum of the constituent uncertainties that represents the overall positioning uncertainty of the position determination.

The overall positioning uncertainty may then be compared by processing logic with a pre-configured uncertainty threshold (processing block 518). In one embodiment, the positioning uncertainty threshold may be pre-configured to ensure that the determined user equipment position is accurate to a certain number of meters, yards, feet, etc. In another embodiment, the positioning uncertainty threshold may be a statistical threshold such that the determined position's potential inaccuracy does not exceed a percentage deviation.

When the determined positioning uncertainty is below the threshold, the process returns to processing block 512, and the processing logic of the APE continues to receives signals collected according to the original collection parameters.

However, when the determined positioning uncertainty is above the threshold, the process proceeds to processing block 520. Processing logic then determines an adjustment to at least one or more of a positioning metric and a mobile device that will reduce the determined uncertainty (processing block 520). As discussed herein, the timing, type, etc. of signals being collected can be adjusted, for example, to avoid interference and subsequently reduce positioning uncertainty. As another example, the position of an array mobile device may be adjusted within the array (e.g., by instructions that cause the array mobile device to move positions) so that the array mobile device can avoid and/or reduce uncertainty for signals collected at a new position. As yet another example, a mobile device may either be added or removed from the array based on its motion and predicted positioning (e.g., to ensure a device is located within a physical or virtual boundary that defines an array during signal collection). As yet another example, positions of a plurality of mobile device may be simultaneously changed to configure arrays of mobile devices having collection arrays of different shapes (e.g., collection devices arranged linearly, in a grid, in a sphere, etc.). Other adjustments that reduce positioning uncertainty may be made to the array of mobile devices consistent with the discussion herein.

Processing logic utilizes the determined adjustment(s) to send new signal collection instructions to the array mobile device by returning to processing block 502.

Although FIG. 5 illustrates the array positioning engine interacting with a single array mobile device, as discussed herein, the array positioning engine may interact with any number of different array mobile devices simultaneously to obtain signals collected from the array mobile devices. The interaction between the array positioning engine and the plurality of array mobile device enables the array positioning engine to make different adjustments to different devices, make adjustments to the overall array, and to otherwise tune the array's signal collection in real time to reduce positioning uncertainty.

Figure 6:
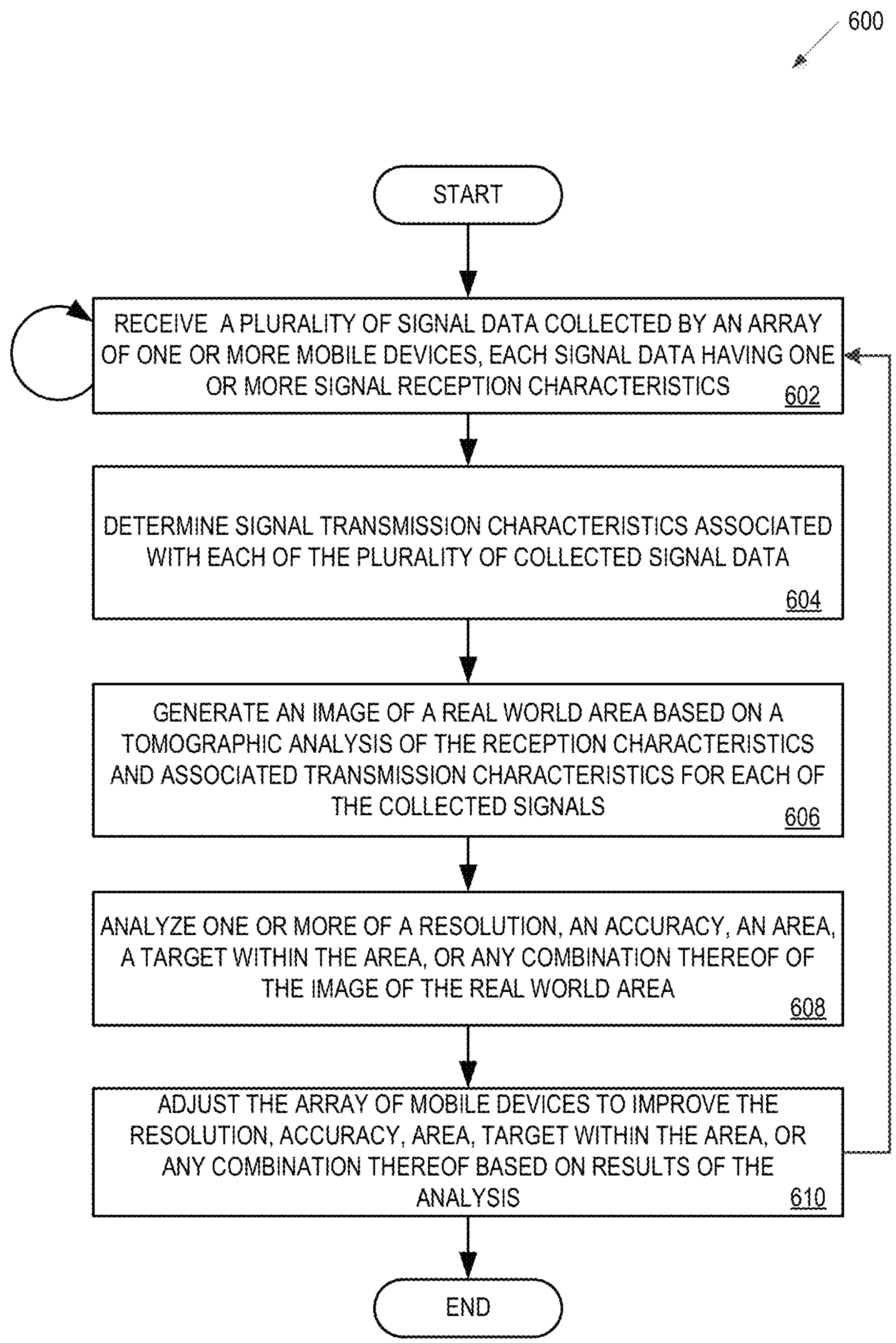
FIG. 6 is a flow diagram of one embodiment of a method for imaging a real world area using an array of mobile devices.

FIG. 6 is a flow diagram of one embodiment of a method 600 for imaging a real world area using an array of mobile devices. The method 600 is performed by processing logic that may comprise hardware (circuitry, dedicated logic, etc.), software (such as is run on a general purpose computer system or a dedicated machine), firmware, or a combination. In one embodiment, the method 500 is performed by an array positioning engine (e.g., array positioning engine of user equipment 110 or 202, array positioning engine of computing device 150, an array positioning engine of an array device 120 or 250, or an array positioning engine distributed between two or more devices).

Referring to FIG. 6, processing logic begins by receiving a plurality of signal data collected by an array of one or more mobile devices where data for each of the received signals has one or more signal reception characteristics (processing block 602). As discussed herein, the signal reception characteristics (e.g., signal power, signal frequency, signal direction, reception location, etc.) associated with a signal are those characteristics measured by an array mobile device that received the particular signal. In embodiments, processing logic receives a plurality of signal data from a plurality of different array mobile devices. Furthermore, as discussed herein, the signals are transmitted by other array mobile devices, and encoded with additional data, such as transmission device identifier(s), transmit location, the transmission signal characteristics, etc. In embodiments, this additional data is provided to processing logic as part of the received signal data.

Processing logic determines one or more signal transmission characteristics associated with each of the plurality of collected signal data (processing block 604). In embodiments, the signal transmission characteristics are associated with a corresponding received signal data (e.g., measured signal reception characteristics) based on an identifier extracted from a received signal. In embodiments, processing logic is able to use the identifier to associate the source of a signal and one or more signal transmission characteristics that the source used to generate the signal with the measured signal reception characteristics.

Processing logic then generates an image of a real world area based on a tomographic analysis of the reception characteristics and associated transmission characteristics for each of the collected signals (processing block 606). As discussed herein, the differences in the signal reception and transmission characteristics are caused by signal reflection, deflection, absorption, or other factors as the signals pass through a real world area. Furthermore, the collection of reception and transmission characteristics corresponding with a plurality of signals that pass through a real world area, and which are collected/generated by array mobile device that at least partially surround the real world area. As a result, a mesh of signals transmitted and received by the array of mobile devices, and the resulting absorption, deflection, reflection, etc. enables processing logic to apply an iterative, recursive, or other computed tomographic image processing technique to the collection of signal data to generate the image of the real world area. In embodiments, processing logic may perform one or more tomographic image reconstruction techniques including filtered back projection (FBP), an algebraic reconstruction techniques additive correction (ART), a simultaneous iterative reconstruction technique (SIRT), an algebraic reconstruction techniques multiplicative correction (MART), a simultaneous MART (SMART) process, as well as other tomographic image reconstruction processes. In embodiments, the image of the real world area is a three dimensional model of the area computed by processing logic in real time, or near real time, as the signals are transmitted by array devices, collected by the array devices, and then provided to processing logic.

Processing logic further analyzes one or more of a resolution, accuracy, an area, a target within the area, or any combination thereof of the image of the real world area (processing block 608). In embodiments, various factors can impact the quality and/or usefulness of the image generated at processing block 606. For example, a number of signal measurements, a number of array mobile devices that perform signal transmission/reception, a density of array mobile devices relative to an area being imaged, a density of array mobile devices relative to a target within an area being imaged, movement of a target between successive images, geometrical orientation and/or relative position of array mobile devices performing signal reception/transmission, as well as other factors, can impact the signal data used by processing logic when generating the image of the real world area. That is, an array of mobile devices transmitting/receiving signals in a single plane surrounding an area being imaged may result in image data having a high resolution for the single plane, but which does not sufficiently capture three dimensional data for a real world area of interest. As another example, array mobile devices concentrated in sub regions surrounding an area of interest during signal reception/transmission may result in imaging data being absent from certain areas of the region of interest.

Processing logic therefore adjusts the array of mobile devices to improve the resolution, accuracy, area, target within the area, or any combination thereof based on results of the analysis (processing block 610). In embodiments, the adjustment to the array of mobile device may be an adjustment to signal transmission characteristics, such as an adjustment to transmission frequency, transmission power, orientation of transmission device, or any combination thereof. The adjustment of signal transmission characteristics may also include adjustment to physical properties of one or more array mobile devices, such as adjustments to a position of a single array mobile device, an adjustment of two or more array mobile devices relative to one another, geometrically configuring the array of mobile devices into a specific shape, etc. In embodiments, the adjustment of signal transmission characteristics can include a combination of factors including, for a period in which an image is generated, subdividing the period and having each array mobile device transmit and collect signals from two or more different locations. As a result, the density of the mesh of signals transmitter/received by the array of mobile devices for the period in which the image is generated is increased without requiring additional array mobile devices. In yet another embodiment, the adjustment can include adding and/or removing mobile devices form the array based on projected trajectories of those devices (e.g., leaving or entering an area that defines the array), based on whether the device provides reliable transmission/reception, etc.

In embodiments, processing logic returns to processing block 602 to receive another plurality of signal data collected by the array of one or more mobile devices. The collection of additional signal data enables processing logic to update and/or replace the image of the real world area (e.g. processing block 606) with the updated signal data. In embodiments, the process is performed at sufficiently small intervals, such as 1 minute, 10 second, 1 second, $1/10^{th}$ of a second, etc. so that the images of the real world area can be generated at the given interval to reflect real time conditions of the area being imaged.

Figure 7:
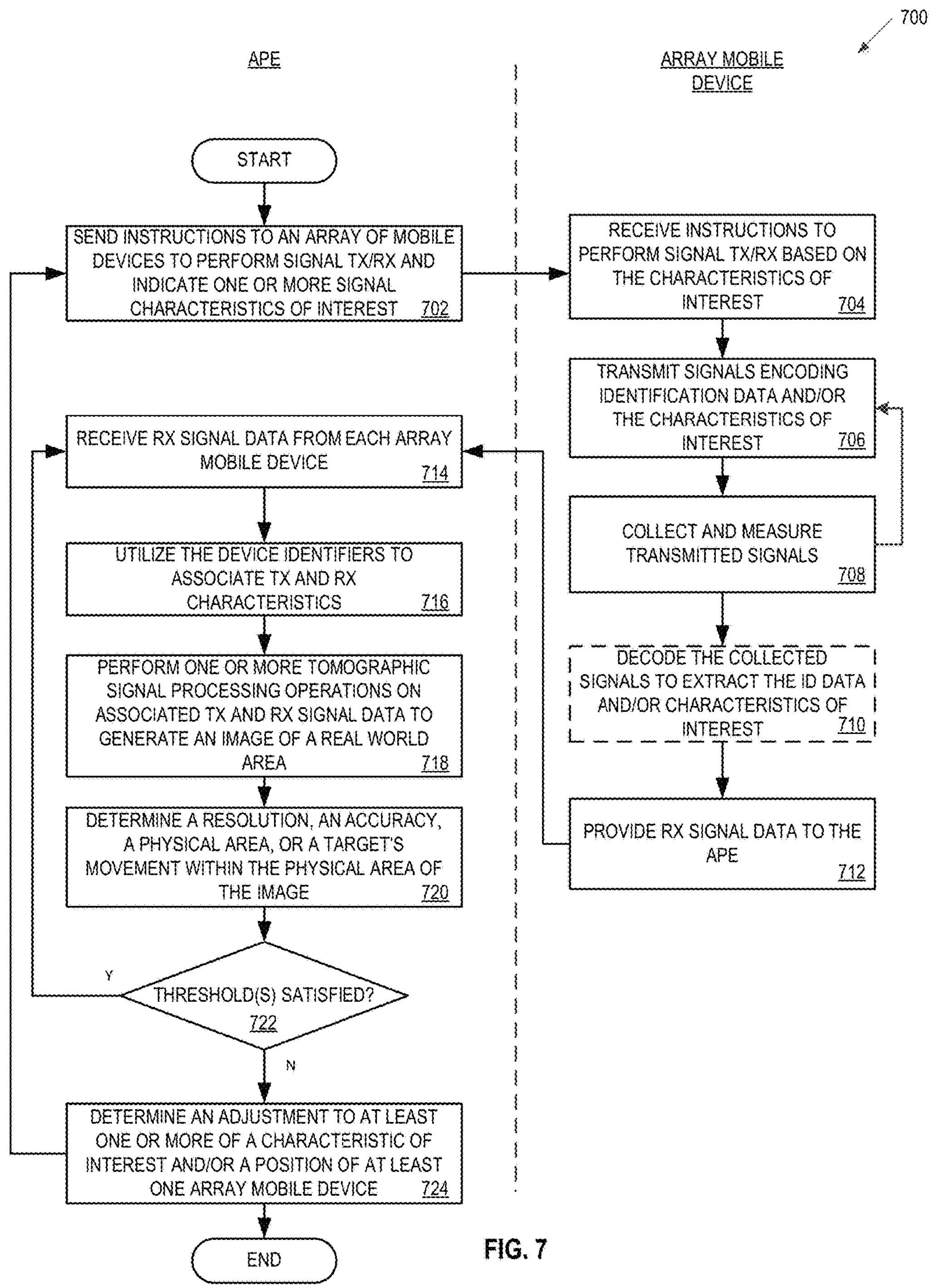
FIG. 7 is a flow diagram of one embodiment of a method for managing an array of mobile devices during real time imaging of a real world area.

FIG. 7 is a flow diagram of one embodiment of a method 700 for managing an array of mobile devices during real time imaging of a real world area. The method 700 is performed by processing logic that may comprise hardware (circuitry, dedicated logic, etc.), software (such as is run on a general purpose computer system or a dedicated machine), firmware, or a combination. In one embodiment, the method 700 is performed by processing logic for an array positioning engine (e.g., APE 142 or 220) and processing logic for an array mobile device (e.g., array mobile device 120 or 250).

Referring to FIG. 7, processing logic of the APE begins by sending instructions to the array mobile device to perform signal transmission and reception with an indication of one or more signal characteristics of interest (processing block 702). In embodiments, the signal characteristics of interest can be selected by processing logic based on a tomographic image processing technique and the signal data types/properties that suit the tomographic image processing technique. For example, signal transmission location of a single array mobile device, relative locations of a plurality of array mobile devices, signal transmission frequency, signal transmission power, period in which signals are to be transmitted, transmitter identifiers, etc. can be specified by the APE in the instructions.

Processing logic of the array mobile device receives the instructions to perform the signal transmission and reception based on the characteristics of interest (processing block 704). In response to the instructions, processing logic of the array mobile device transmits one or more signals encoding at least identification data of the array mobile device and optionally one or more of the characteristics of interest (processing block 606). The encoding of the identifier for each signal transmitter/array device, as discussed herein, enables the APE to correlate signal transmission characteristics from the instructions with measured signal reception characteristics.

Processing logic of the array mobile device then collects and measures transmitted signals (processing block 708). The collected signals can be those generated by other array mobile devices, and which have passed through a real world area being imaged. The collected signals can also be the array mobile device's own signals that are reflected back to the array mobile device. Processing logic further generates one or more measurements from the received signals, such as direction of arrival, signal power, signal frequency, etc.

Regardless of the source of the received signals, processing logic of the array mobile device optionally decodes the collected signals to extract various data, such as device identifiers, signal transmission characteristics, etc., from the collected signals (processing block 710). Processing logic of the array mobile device then provides received signal data, including any extracted information and signal measurements, to the APE (processing block 712).

Processing logic of the APE receives the signal reception data from each array mobile device of an array of mobile devices (processing block 714). In embodiments, the signal reception data includes measured signal reception characteristics, device identifiers associated with the measured characteristics, and any other extracted signal data.

The device identifiers from the signal reception data are then used by processing logic to associate measured signal reception characteristics with signal transmission characteristics for each array mobile device (processing block 716). In embodiments, there may be many times more samples of measured signal reception characteristics than signal transmitters, as each array mobile device may receive signals from different subsets of array mobile device. The multiple signal receptions made by each array mobile device enables a dense mesh of signals, and measurements made for those signals, to be created within a real world area being imaged.

Processing logic performs one or more tomographic signal processing operations on the associated signal transmission and measured reception characteristics to generate an image of a real world area (processing block 718). In embodiments, the area is a real world area in which the mesh of signals pass through, such as a real world area surrounded by an array of mobile devices. Furthermore, the image generated by the tomographic signal processing operation(s) is a three dimensional model of the real world area, including a model of the objects within the area.

Processing logic then determines an accuracy, resolution, physical area, or target's movement within the physical area of the image (processing block 720). As discussed above, factors such as accuracy and resolution can be determined based on the characteristics of the array, such as density relative to an area being image, number of array mobile devices, distance from an area being imaged, etc. Factors such as appropriateness of a physical area and tracking a target's movements within an area can be based on changes to a location of the target, positions of array mobile devices relative to an area/target being imaged, etc. If one or more of these factors indicative of a measure of image quality fails to meet a minimum threshold (e.g., minimum allowable level of accuracy, minimum allowable resolution, maximum distance from target, maximum distance of target from center of image, etc.), the process proceeds to processing block 720. Processing logic then makes an adjustment to at least one or more of the characteristics of interest and/or positions of array mobile devices (processing block 724), and returns to processing block 702 to provide updated instructions to the array of mobile devices.

However, when the thresholds are satisfied (processing block 722), the process returns to processing block 714 to continue to receive periodic measured signal reception characteristics. In embodiments, any combination of thresholds may be utilized by processing logic at processing block 722 (e.g., only the tracking threshold, a combination of tracking threshold and resolution threshold, etc.).

Like FIG. 4 discussed above, FIG. 7 also illustrates the array positioning engine interacting with a single array mobile device. However, as discussed herein, the array positioning engine may interact with any number of different array mobile devices simultaneously to when generating images of real world areas.

FIG. 8 is one embodiment of a system that may be used as a computing device, such as the user equipment or assistance server discussed above in FIG. 8. It will be apparent to those of ordinary skill in the art, however that other alternative systems of various system architectures may also be used.

Figure 8:
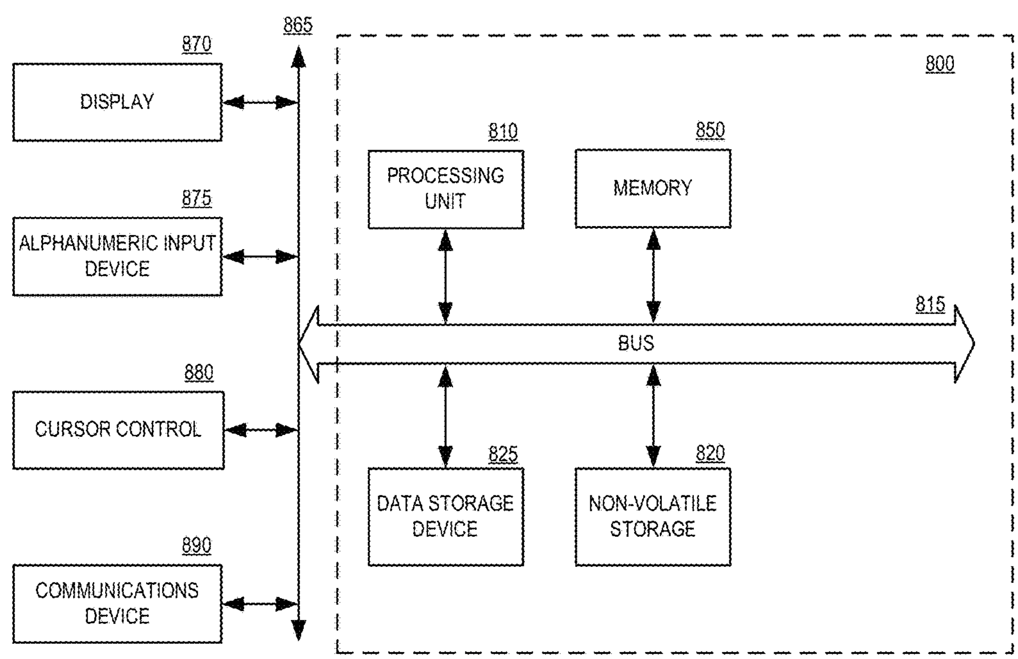
FIG. 8 is a block diagram of a processing system.

The system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a solid state, magnetic, optical, etc. storage device. Data storage device 825 is coupled to bus 815 for storing information and instructions.

The system may further be coupled to a display device 870, such as a light emitting diode (LED), a liquid crystal display (LCD), interferometric modulator display (IMOD), etc., coupled to bus 815 through bus 865 for displaying information to a user. An alphanumeric input device 875, including alphanumeric and other keys, may also be coupled to bus 815 through bus 865 for communicating information and command selections to processor 810. An additional user input device is cursor control device 780, such as a touchscreen display underlay, touchpad, or stylus coupled to bus 815 through bus 865 for communicating direction information and command selections to processor 810.

Another device coupled to system 800 is a communication device 890 for accessing other nodes of a distributed system via a network, such as via LAN, WAN, or other networks. The communication device 890 may include any of a number of commercially available networking devices, such as those used for coupling to an Ethernet, token ring, Internet, or wide area network. Note that any or all of the components of this system illustrated in FIG. 8 and associated hardware may be used in various embodiments.

It will be appreciated by those of ordinary skill in the art that any configuration of the system may be used for various purposes according to the particular implementation. The control logic or software implementing the systems and methods discussed herein can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a non-transitory computer readable medium having computer readable program code embodied therein and being readable by the mass storage device 825 and for causing the processor 810 to operate in accordance with the methods and teachings herein.

The systems and methods discussed herein may also be embodied in a handheld, portable, or multimedia device containing a subset of the hardware components described above. For example, a handheld or portable device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation for such a device would be apparent to one of ordinary skill in the art given the disclosure of the systems and methods as provided herein.

The systems and methods discussed herein may also be embodied in a special purpose appliance, such as a wearable device, gaming device, medical device, or other device, including a subset of the hardware components described above. For example, the appliance may include a processor 810, a data storage device 825, a bus 815, and memory 850, and only rudimentary communications mechanisms, such as a small touch-screen or remote control that permits the user to communicate in a basic manner with the device. In general, the more special-purpose the device is, the fewer of the elements need be present for the device to function.

It should be appreciated that the user equipment and one or more of array mobile device(s) discussed herein may communicate via one or more wireless communication links through a wireless network that are based on or otherwise support any suitable wireless communication technology. For example, the user equipment and array mobile device(s) may associate with a network including a wireless network. In some aspects the network may comprise a local area network or a wide area network. Furthermore, the user equipment and array mobile device(s) may support or otherwise use one or more of a variety of wireless communication technologies, protocols, or standards such as, for example, CDMA, TDMA, OFDM, OFDMA, WiMAX, and Wi-Fi.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for utilizing an array of one or more mobile devices to improve one or more positioning metrics of a user equipment, the method comprising:

receiving positioning metrics associated with signals collected by the one or more mobile devices in the array, wherein the signals are wireless communication network signals generated by the user equipment;

determining a first position of the user equipment based on the positioning metrics;

determining a new position for at least one mobile device in the array of the one or more mobile devices based on the first position of the user equipment;

transmitting the new position to the at least one mobile device;

receiving new positioning metrics associated with signals collected by the at least one mobile device at the new position; and determining a second position of the user equipment based on the positioning metrics and the new positioning metrics.

2. The method of claim 1, wherein the user equipment comprises a mobile device.

3. The method of claim 1, wherein the array of the one or more mobile devices comprises one or more unmanned vehicles, one or more manned vehicles, or a combination thereof.

4. The method of claim 1, further comprises:

determining an uncertainty of the determined position of the user equipment based on the positioning metrics, wherein the positioning metrics are indicative of a precision of the associated signals and comprise: a signal strength, an orientation of the one or more mobile devices in the array when the signal was captured, signal timing data, relative signal timing associated with signals received at different mobile devices within the one or more mobile devices in the array, signal power, a location of a mobile device within the array of the mobile devices, relative locations of the at least one mobile device from the one or more mobile devices in the array, or any combination thereof; and wherein the determining the new position for the at least one mobile device in the array of the mobile devices is further based on the uncertainty of the determined position of the user equipment.

5. A system for utilizing an array of one or more mobile devices to improve one or more positioning metrics of a user equipment, the system comprising:

a memory to store received positioning metrics associated with signals collected by the one or more mobile devices in the array, wherein the signals are wireless communication network signals generated by the user equipment; and one or more processors coupled with the memory configured to:

determine a first position of the user equipment based on the positioning metrics; and determine a new position for at least one mobile device in the array of the one or more mobile devices based on the first position of the user equipment;

transmit the new position to the at least one mobile device;

receive new positioning metrics associated with signals collected by the at least one mobile device at the new position; and determine a second position of the user equipment based on the positioning metrics and the new positioning metrics.

6. The system of claim 5, wherein the array of one or more mobile devices comprises one or more unmanned vehicles, one or more manned vehicles, one or more drone aircraft, or a combination thereof.

7. An apparatus for utilizing an array of one or more mobile devices to improve one or more positioning metrics of a user equipment, comprising:

means for receiving positioning metrics associated with signals collected by the one or more mobile devices in the array, wherein the signals are wireless communication network signals generated by the user equipment;

means for determining a first position of the user equipment based on the positioning metrics;

means for determining a new position for at least one mobile device in the array of the one or more mobile devices, based on the first position of the user equipment;

means for transmitting the new position to the at least one mobile device; and means for receiving new positioning metrics associated with signals collected by the at least one mobile device at the new position; and means for determining a second position of the user equipment based on the positioning metrics and the new positioning metrics.

8. A non-transitory computer readable storage medium for utilizing an array of one or more mobile devices to improve one or more positioning metrics of a user equipment comprising processor-executable program code configured to cause one or more processors to:

receive positioning metrics associated with signals collected by the one or more mobile devices in the array, wherein the signals are wireless communication network signals generated by the user equipment;

determine a first position of the user equipment based on the positioning metrics; and determine a new position for at least one mobile device in the array of the one or more mobile devices based on the first position of the user equipment;

transmit the new position to the at least one mobile device;

receive new positioning metrics associated with signals collected by the at least one mobile device at the new position; and determine a second position of the user equipment based on the positioning metrics and the new positioning metrics.

* * * * *